(12) United States Patent
Menapace et al.

(10) Patent No.: US 12,524,925 B2
(45) Date of Patent: Jan. 13, 2026

(54) HIERARCHICAL PATCH-WISE DIFFUSION MODELS FOR HIGH-RESOLUTION VIDEO GENERATION

(71) Applicant: Snap Inc., Santa Monica, CA (US)

(72) Inventors: Willi Menapace, Santa Monica, CA (US); Aliaksandr Siarohin, Los Angeles, CA (US); Ivan Skorokhodov, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 128 days.

(21) Appl. No.: 18/437,790

(22) Filed: Feb. 9, 2024

(65) Prior Publication Data

US 2025/0259339 A1    Aug. 14, 2025

(51) Int. Cl.
| | | |
|---|---|---|
| *G06T 11/00* | (2006.01) | |
| *G06T 3/4007* | (2024.01) | |
| *G06T 3/4046* | (2024.01) | |
| *G06T 5/60* | (2024.01) | |
| *G06T 5/70* | (2024.01) | |

(52) U.S. Cl.
CPC ............ *G06T 11/00* (2013.01); *G06T 3/4007* (2013.01); *G06T 3/4046* (2013.01); *G06T 5/60* (2024.01); *G06T 5/70* (2024.01); *G06T 2207/10016* (2013.01); *G06T 2207/20016* (2013.01); *G06T 2207/20081* (2013.01); *G06T 2207/20084* (2013.01)

(58) Field of Classification Search
None
See application file for complete search history.

(56) References Cited

PUBLICATIONS

Wang et al., "VideoFactory: Swap Attention in Spatiotemporal Diffusions for Text-to-Video Generation", arXiv, 2023. (Year: 2023).*
Huangjie Zheng, Zhendong Wang, Jianbo Yuan, Guanghan Ning, Pengcheng He, Quanzeng You, Hongxia Yang, and Mingyuan Zhou, "Learning Stackable and Skippable LEGO Bricks for Efficient, Reconfigurable, and Variable-Resolution Diffusion Modeling," arXiv:2310.06389v2 [cs.CV], Nov. 29, 2023.

(Continued)

*Primary Examiner* — Nicholas R Wilson
(74) *Attorney, Agent, or Firm* — CM Law; Stephen J. Weed

(57) ABSTRACT

Hierarchical patch-wise diffusion models (HPDMs) use a diffusion paradigm that learns a hierarchical distribution of patches instead of whole videos for efficient patch-wise training of diffusion models. To enforce consistency between the patches, deep context fusion may be used to propagate the context information from low-scale to high-scale patches in a hierarchical manner. To accelerate patch-wise training and inference, adaptive computation also may be used to allocate more computational resources and network capacity towards coarse image details and to cheapen synthesis of high-frequency texture details. All the processing stages are jointly trained to provide spatially aligned global context to the higher levels of the cascade. As a result, the model does not operate on the full-resolution inputs, which allows the model to be trained on high-resolution video datasets in an end-to-end fashion.

20 Claims, 7 Drawing Sheets

(56) References Cited

PUBLICATIONS

International Search Report and Written Opinion for International Application No. PCT/US2025/014608, dated May 13, 2025 (May 13, 2025)—10 pages.

Ivan Skorokhodov, Willi Menapace, Aliaksandr Siarohin, and Sergey Tulyakov, "Hierarchical Patch Diffusion Models for High-Resolution Video Generation," arXiv:2406.07792v1 [cs.CV] Jun. 12, 2024.

NPL 01. Zeroscope. https://huggingface.co/cerspense/zeroscope_v2_576w, 2022. Accessed: Nov. 1, 2023.

NPL 02. Omer Bar-Tal, Lior Yariv, Yaron Lipman, and Tali Dekel. Multidiffusion: Fusing Diffusion Paths for Controlled Image Generation. arXiv preprint arXiv:2302.08113, 2023.

NPL 03. James Betker, Gabriel Goh, Li Jing, Tim Brooks†, Jianfeng Wang, Linjie Li, Long Ouyang, Juntang Zhuang, Joyce Lee, Yufei Guo†, Wesam Manassra, Prafulla Dhariwal, Casey Chu, Yunxin Jiao†, and Aditya Ramesh. Improving Image Generation with Better Captions. https://cdn.openai.com/papers/dall-e-3.pdf, 2023. Accessed: Nov. 14, 2023.

NPL 04. Andreas Blattmann, Robin Rombach, Huan Ling, Tim Dock-horn, Seung Wook Kim, Sanja Fidler, and Karsten Kreis. Align your Latents: High-Resolution Video Synthesis with Latent Diffusion Models. In Proceedings of the IEEE/CVF Conference on Computer Vision and Pattern Recognition, pp. 22563-22575, 2023.

NPL 05. Hanting Chen, Yunhe Wang, Tianyu Guo, Chang Xu, Yiping Deng, Zhenhua Liu, Siwei Ma, Chunjing Xu, Chao Xu, and Wen Gao. Pre-trainedlimage Processing Transformer. In Proceedings of the IEEE/CVF conference on computer vision and pattern recognition, pp. 12299-12310, 2021.

NPL 06. Ting Chen. On the Importance of Noise Scheduling for Diffusion Models. arXiv preprint arXiv:2301.10972, 2023.

NPL 07. Katherine Crowson, Stefan Andreas Baumann, Alex Birch, Tanishq Mathew Abraham, Daniel Z Kaplan, and Enrico Shippole. Scalable High-Resolution Pixel-Space Image Synthesis with Hourglass Diffusion Transformers. arXiv preprint arXiv:2401.11605, 2024.

NPL 08. Xiaoliang Dai, Ji Hou, Chih-Yao Ma, Sam Tsai, Jialiang Wang, Rui Wang, Peizhao Zhang, Simon Vandenhende, Xiaofang Wang, Abhimanyu Dubey, et al. Emu: Enhancing Image Generation Models Using Photogenic Needles in a Haystack. arXiv preprint arXiv:2309.15807, 2023.

NPL 09. Prafulla Dhariwal and Alexander Nichol. Diffusion Models Beat GANs on Image Synthesis. Advances in Neural Information Processing Systems, 34:8780-8794, 2021.

NPL 10. Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An Image is Worth 16×16 words: Transformers for Image Recognition at Scale. arXiv preprint arXiv:2010.11929, 2020.

NPL 11. Patrick Esser, Johnathan Chiu, Parmida Atighehchian, Jonathan Granskog, and Anastasis Germanidis. Structure and Content-Guided Video Synthesis with Diffusion Models. In Proceedings of the IEEE/CVF International Conference on Computer Vision, pp. 7346-7356, 2023.

NPL 12. Rinon Gal, Dana Cohen Hochberg, Amit Bermano, and Daniel Cohen-Or. SWAGAN: A Style-based WAvelet-driven Generative Model. ACM Transactions on Graphics (TOG), 40(4):1-11, 2021.

NPL 13. Songwei Ge, Thomas Hayes, Harry Yang, Xi Yin, Guan Pang, David Jacobs, Jia-Bin Huang, and Devi Parikh. Long Video Generation with Time-Agnostic VQGAN and Time-Sensitive Transformer. In European Conference on Computer Vision, pp. 102-118. Springer, 2022.

NPL 14. Songwei Ge, Seungjun Nah, Guilin Liu, Tyler Poon, Andrew Tao, Bryan Catanzaro, David Jacobs, Jia-Bin Huang, Ming-Yu Liu, and Yogesh Balaji. Preserve Your Own Correlation: A Noise Prior for Video Diffusion Models. In Proceedings of the IEEE/CVF International Conference on Computer Vision, pp. 22930-22941, 2023.

NPL 15. Michal Geyer, Omer Bar-Tal, Shai Bagon, and Tali Dekel. Tokenflow: Consistent Diffusion Features for Consistent Video Editing. arXiv preprint arxiv:2307.10373, 2023.

NPL 16. Ian Goodfellow, Jean Pouget-Abadie, Mehdi Mirza, Bing Xu, David Warde-Farley, Sherjil Ozair, Aaron Courville, and Yoshua Bengio. Generative Aversarial nets. In Adv. Neural Inform. Process. Syst., 2014.

NPL 17. Niv Granot, Ben Feinstein, Assaf Shocher, Shai Bagon, and Michal Irani. Drop the GAN: In Defense of Patches Nearest Neighbors as Single Image Generative Models. In Proceedings of the IEEE/CVF Conference on Computer Vision and Pattern Recognition, pp. 13460-13469, 2022.

NPL 18. Jiatao Gu, Shuangfei Zhai, Yizhe Zhang, Miguel Angel Bautista, and Josh Susskind. f-DM: A Multi-Stage Diffusion Model Via Progressive Signal Transformation. arXiv preprint arXiv:2210.04955, 2022.

NPL 19. Jiatao Gu, Shuangfei Zhai, Yizhe Zhang, Josh Susskind, and Navdeep Jaitly. Matryoshka Diffusion Models. arXiv preprint arXiv:2310.15111, 2023.

NPL 20. Yuwei Guo, Ceyuan Yang, Anyi Rao, Yaohui Wang, Yu Qiao, Dahua Lin, and Bo Dai. ANIMATEDIFF: Animate Your Personalized Text-to-Image Diffusion Models Without Specific Tuning. arXiv preprint arXiv:2307.04725, 2023.

NPL 21. Yingqing He, Tianyu Yang, Yong Zhang, Ying Shan, and Qifeng Chen. Latent Video Diffusion Models for High-Fidelity Video Generation with Arbitrary Lengths. arXiv preprint arXiv:2211.13221, 2022.

NPL 22. Jonathan Ho, William Chan, Chitwan Saharia, Jay Whang, Ruiqi Gao, Alexey Gritsenko, Diederik P Kingma, Ben Poole, Mohammad Norouzi, David J Fleet, et al. Imagen Video: High Definition Video Generation with Diffusion Models. arXiv preprint arXiv:2210.02303, 2022.

NPL 23. Jonathan Ho, Chitwan Saharia, William Chan, David J Fleet, Mohammad Norouzi, and Tim Salimans. Cascaded Diffusion Models for High Fidelity Image Generation. The Journal of Machine Learning Research, 23 (1):2249-2281, 2022.

NPL 24. Jonathan Ho, Tim Salimans, Alexey Gritsenko, William Chan, Mohammad Norouzi, and David J Fleet. Video Diffusion Models. arXiv:2204.03458, 2022.

NPL 25. Wenyi Hong, Ming Ding, Wendi Zheng, Xinghan Liu, and Jie Tang. COGVideo: Large-Scale Pretraining for Text-to-Video Generation via Transformers. arXiv preprint arXiv:2205.15868, 2022.

NPL 26. Emiel Hoogeboom, Jonathan Heek, and Tim Salimans. Simple Diffusion: End-to-End Diffusion for High Resolution Images. arXiv preprint arXiv:2301.11093, 2023.

NPL 27. Allan Jabri, David Fleet, and Ting Chen. Scalable Adaptive Computation for Iterative Generation. arXiv preprint arXiv:2212.11972, 2022.

NPL 28. Minguk Kang, Jun-Yan Zhu, Richard Zhang, Jaesik Park, Eli Shechtman, Sylvain Paris, and Taesung Park. Scaling Up GANs for Text-to-Image Synthesis. In Proceedings of the IEEE/CVF Conference on Computer Vision and Pattern Recognition, pp. 10124-10134, 2023.

NPL 29. Tero Karras, Miika Aittala, Timo Aila, and Samuli Laine. Elucidating the Design Space of Diffusion-Based Generative Models. Advances in Neural Information Processing Systems, 35:26565-26577, 2022.

NPL 30. Levon Khachatryan, Andranik Movsisyan, Vahram Tadevosyan, Roberto Henschel, Zhangyang Wang, Shant Navasardyan, and Humphrey Shi. Text2Video-Zero: Text-to-Image Diffusion Models are Zero-Shot Video Generators. arXiv preprint arXiv:2303.13439, 2023.

NPL 31. Subin Kim, Kyungmin Lee, June Suk Choi, Jongheon Jeong, Kihyuk Sohn, and Jinwoo Shin. Collaborative Score Distillation for Consistent Visual Synthesis. arXiv preprint arXiv:2307.04787, 2023.

NPL 32. Diederik P Kingma and Ruiqi Gao. Understanding the Diffusion Objective as a Weighted Integral of ELBOS. arXiv preprint arXiv:2303.00848, 2023.

NPL 33. Diederik P. Kingma and Max Welling. Auto-Encoding Variational Bayes. arXiv preprint arXiv:1312.6114, 2013.

(56) References Cited

PUBLICATIONS

NPL 34. Vladimir Kulikov, Shahar Yadin, Matan Kleiner, and Tomer Michaeli. Sinddm: A Single Image Denoising Diffusion Model. In International Conference on Machine Learning, pp. 17920-17930. PMLR, 2023.

NPL 35. Yanyu Li, Huan Wang, Qing Jin, Ju Hu, Pavlo Chemerys, Yun Fu, Yanzhi Wang, Sergey Tulyakov, and Jian Ren. Snap-fusion: Text-to-Image Diffusion Model on Mobile Devices within Two Seconds. arXiv preprint arXiv:2306.00980, 2023.

NPL 36. Chieh Hubert Lin, Chia-Che Chang, Yu-Sheng Chen, Da-Cheng Juan, Wei Wei, and Hwann-Tzong Chen. COCO-GAN: Generation by Parts via Conditional Coordinating. In ICCV, 2019.

NPL 37. Zhengxiong Luo, Dayou Chen, Yingya Zhang, Yan Huang, Liang Wang, Yujun Shen, Deli Zhao, Jingren Zhou, and Tieniu Tan. Videofusion: Decomposed Diffusion Models for High-Quality Video Generation. In Proceedings of the IEEE/CVF Conference on Computer Vision and Pattern Recognition (CVPR), 2023.

NPL 38. Kangfu Mei and Vishal Patel. VIDM: Video Implicit Diffusion Models. In Proceedings of the AAAI Conference on Artificial Intelligence, pp. 9117-9125, 2023.

NPL 39. Willi Menapace, Aliaksandr Siarohin, Ivan Skorokhodov, Ekaterina Deyneka, Tsai-Shien Chen, Anil Kag, Yuwei Fang, Aleksei Stoliar, Elisa Ricci, Jian Ren, et al. Snap Video: Scaled Spatiotemporal Transformers for Text-to-Video Synthesis. arXiv preprint arXiv:2402.14797, 2024.

NPL 40. Yaniv Nikankin, Niv Haim, and Michal Irani. SinFusion: Training Diffusion Models on a Single Image or Video. arXiv preprint arXiv:2211.11743, 2022.

NPL 41. Dustin Podell, Zion English, Kyle Lacey, Andreas Blattmann, Tim Dockhorn, Jonas Muller, Joe Penna, and Robin Rombach. SDXL: Improving Latent Diffusion Models for High-Resolution Image Synthesis. arXiv preprint arXiv:2307.01952, 2023.

NPL 42. Colin Raffel, Noam Shazeer, Adam Roberts, Katherine Lee, Sharan Narang, Michael Matena, Yanqi Zhou, Wei Li, and Peter J Liu. Exploring the Limits of Transfer Learning with a Unified Text-to-Text Transformer. The Journal of Machine Learning Research, 21(1):5485-5551, 2020.

NPL 43. Aditya Ramesh, Prafulla Dhariwal, Alex Nichol, Casey Chu, and Mark Chen. Hierarchical Text-Conditional Image Generation with Clip Latents. arXiv preprint arXiv:2204.06125, 2022.

NPL 44. Robin Rombach, Andreas Blattmann, Dominik Lorenz, Patrick Esser, and Bjorn Ommer. High-Resolution Image Synthesis with Latent Diffusion Models. In Proceedings of the IEEE/CVF Conference on Computer Vision and Pattern Recognition, pp. 10684-10695, 2022.

NPL 45. Olaf Ronneberger, Philipp Fischer, and Thomas Brox. U-Net: Convolutional Networks for Biomedical Image Segmentation. In Medical Image Computing and Computer-Assisted Intervention—MICCAI 2015: 18th International Conference, Munich, Germany, Oct. 5-9, 2015, Proceedings, Part III 18, pp. 234-241. Springer, 2015.

NPL 46. Masaki Saito, Shunta Saito, Masanori Koyama, and Sosuke Kobayashi. Train Sparsely, Generate Densely: Memory-Efficient Unsupervised Training of High-Resolution Temporal GAN. International Journal of Computer Vision, 2020.

NPL 47. Tim Salimans and Jonathan Ho. Progressive Distillation for Fast Sampling of Diffusion Models. In International Conference on Learning Representations, 2022.

NPL 48. Katja Schwarz, Yiyi Liao, Michael Niemeyer, and Andreas Geiger. GRAF: Generative Radiance Fields for 3D-Aware Image Synthesis. In Adv. Neural Inform. Process. Syst., 2020.

NPL 49. Tamar Rott Shaham, Tali Dekel, and Tomer Michaeli. SinGAN: Learning a Generative Model from a Single Natural Image. In ICCV, 2019.

NPL 50. Liao Shen, Xingyi Li, Huiqiang Sun, Juewen Peng, Ke Xian, Zhiguo Cao, and Guosheng Lin. Make-It-4D: Synthesizing a Consistent Long-Term Dynamic Scene Video from a Single Image. In Proceedings of the 31st ACM International Conference on Multimedia, pp. 8167-8175, 2023.

NPL 51. Uriel Singer, Adam Polyak, Thomas Hayes, Xi Yin, Jie An, Songyang Zhang, Qiyuan Hu, Harry Yang, Oron Ashual, Oran Gafni, et al. Make-a-Video: Text-to-Video Generation without Text-Video Data. arXiv preprint arXiv:2209.14792, 2022.

NPL 52. Ivan Skorokhodov, Grigorii Sotnikov, and Mohamed Elhoseiny. Aligning Latent and Image Spaces to Connect the Unconnectable. arXiv preprint arXiv:2104.06954, 2021.

NPL 53. Ivan Skorokhodov, Sergey Tulyakov, and Mohamed Elhoseiny. StyleGAN-V: A Continuous Video Generator with the Price, Image Quality and Perks of StyleGAN2. In CVPR, 2022.

NPL 54. Ivan Skorokhodov, Sergey Tulyakov, Yiqun Wang, and Peter Wonka. EpiGRAF: Rethinking Training of 3D GANs. In Adv. Neural Inform. Process. Syst., 2022.

NPL 55. Yang Song and Stefano Ermon. Generative Modeling by Estimating Gradients of the Data Distribution. Advances in Neural Information Processing Systems, 32, 2019.

NPL 56. Khurram Soomro, Amir Roshan Zamir, and Mubarak Shah. UCF101: A Dataset of 101 Human Actions Classes from Videos in the Wild. arXiv preprint arXiv:1212.0402, 2012.

NPL 57. Jiayan Teng, Wendi Zheng, Ming Ding, Wenyi Hong, Jian-qiao Wangni, Zhuoyi Yang, and Jie Tang. Relay Diffusion: Unifying Diffusion Process Across Resolutions for Image Synthesis. arXiv preprint arXiv:2309.03350, 2023.

NPL 58. Yu Tian, Jian Ren, Menglei Chai, Kyle Olszewski, Xi Peng, Dimitris N. Metaxas, and Sergey Tulyakov. A Good Image Generator is What You Need for High-Resolution Video Synthesis. In ICLR, 2021.

NPL 59. Thomas Unterthiner, Sjoerd van Steenkiste, Karol Kurach, Raphael Marinier, Marcin Michalski, and Sylvain Gelly. Towards Accurate Generative Models of Video: A New Metric & Challenges. arXiv preprint arXiv:1812.01717, 2018.

NPL 60. Arash Vahdat, Karsten Kreis, and Jan Kautz. Score-Based Generative Modeling in Latent Space. 2021. arXiv preprint arXiv:2106.05931, 2021.

NPL 61. Ashish Vaswani, Noam Shazeer, Niki Parmar, Jakob Uszkoreit, Llion Jones, Aidan N Gomez, Łukasz Kaiser, and Illia Polosukhin. Attention is All You Need. Advances in Neural Information Processing Systems, 30, 2017.

NPL 62. Weilun Wang, Jianmin Bao, Wengang Zhou, Dongdong Chen, Dong Chen, Lu Yuan, and Houqiang Li. SinDiffusion: Learning a Diffusion Model from a Single Natural Image. arXiv preprint arXiv:2211.12445, 2022.

NPL 63. Wenjing Wang, Huan Yang, Zixi Tuo, Huiguo He, Junchen Zhu, Jianlong Fu, and Jiaying Liu. VideoFactory: Swap Attention in Spatiotemporal Diffusions for Text-to-Video Generation. arXiv preprint arXiv:2305.10874, 2023.

NPL 64. Zhendong Wang, Yifan Jiang, Huanjie Zheng, Peihao Wang, Pengcheng He, Zhangyang Wang, Weizhu Chen, and Mingyuan Zhou. Patch Diffusion: Faster and More Data-Efficient Training of Diffusion Models. arXiv preprint arXiv:2304.12526, 2023.

NPL 65. Jay Zhangjie Wu, Yixiao Ge, Xintao Wang, Stan Weixian Lei, Yuchao Gu, Yufei Shi, Wynne Hsu, Ying Shan, Xiaohu Qie, and Mike Zheng Shou. Tune-a-Video: One-Shot Tuning of Image Diffusion Models for Text-to-Video Generation. In Proceedings of the IEEE/CVF International Conference on Computer Vision, pp. 7623-7633, 2023.

NPL 66. Shuai Yang, Yifan Zhou, Ziwei Liu, and Chen Change Loy. Rerender a Video: Zero-Shot Text-Guided Video-to-Video Translation. arXiv preprint arXiv:2306.07954, 2023.

NPL 67. Yang You, Jing Li, Sashank Reddi, Jonathan Hseu, Sanjiv Kumar, Srinadh Bhojanapalli, Xiaodan Song, James Demmel, Kurt Keutzer, and Cho-Jui Hsieh. Large Batch Optimization for Deep Learning: Training BERT in 76 Minutes. arXiv preprint arXiv:1904.00962, 2019.

NPL 68. Lijun Yu, Yong Cheng, Kihyuk Sohn, Jose' Lezama, Han Zhang, Huiwen Chang, Alexander G Hauptmann, Ming-Hsuan Yang, Yuan Hao, Irfan Essa, et al. MAGVIT: Masked Generative Video Transformer. In Proceedings of the IEEE/CVF Conference on Computer Vision and Pattern Recognition, pp. 10459-10469, 2023.

NPL 69. Lijun Yu, Jose' Lezama, Nitesh B Gundavarapu, Luca Ver-sari, Kihyuk Sohn, David Minnen, Yong Cheng, Agrim Gupta,

(56) References Cited

PUBLICATIONS

Xiuye Gu, Alexander G Hauptmann, et al. Language Model Beats Diffusion-Tokenizer is Key to Visual Generation. arXiv preprint arXiv:2310.05737, 2023.

NPL 70. Sihyun Yu, Jihoon Tack, Sangwoo Mo, Hyunsu Kim, Junho Kim, Jung-Woo Ha, and Jinwoo Shin. Generating Videos with Dynamics-Aware Implicit Generative Adversarial Networks. In ICLR, 2022.

NPL 71. Sihyun Yu, Kihyuk Sohn, Subin Kim, and Jinwoo Shin. Video Probabilistic Diffusion Models in Projected Latent Space. In Proceedings of the IEEE/CVF Conference on Computer Vision and Pattern Recognition, 2023.

NPL 72. Yanli Zhao, Andrew Gu, Rohan Varma, Liang Luo, Chien-Chin Huang, Min Xu, Less Wright, Hamid Shojanazeri, Myle Ott, Sam Shleifer, et al. PyTorch FSDP: Experiences on Scaling Fully Sharded Data Parallel. arXiv preprint arXiv:2304.11277, 2023.

NPL 73. Hongkai Zheng, Weili Nie, Arash Vahdat, Anima Anandkumar. Fast Training of Diffusion Models with Masked Transformers. Transactions on Machine Learning Research, 2024.

NPL 74. Qingping Zheng, Yuanfan Guo, Jiankang Deng, Jianhua Han, Ying Li, Songcen Xu, and Hang Xu. Any-Size-Diffusion: Toward Efficient Text-Driven Synthesis for Any-Size HD Images. arXiv preprint arXiv:2308.16582, 2023.

NPL 75. Daquan Zhou, Weimin Wang, Hanshu Yan, Weiwei Lv, Yizhe Zhu, ad Jiashi Feng. MagicVideo: Efficient Video Generation with Latent Diffusion Models. arXiv preprint arXiv:2211.11018, 2022.

\* cited by examiner

HIERARCHICAL PATCH-WISE DIFFUSION MODELS FOR HIGH-RESOLUTION VIDEO GENERATION

TECHNICAL FIELD

Examples set forth herein generally relate to image and video synthesis and, in particular, to techniques for implementing hierarchical patch-wise diffusion models (HPDMs) that do not operate on full-resolution inputs but instead jointly optimize all the stages of the hierarchy to produce spatially aligned context information for the later higher resolution pyramid processing levels to enforce global consistency between patches for use in image and video synthesis.

BACKGROUND

Diffusion models (DMs) have achieved remarkable performance in image and video synthesis, greatly surpassing previous dominant generative paradigms, such as generative adversarial nets (GANs), variational autoencoders (VAEs), and autoregressive models. However, scaling DMs to high-resolution inputs broke their end-to-end nature, since training the full-scale monolithic foundational generator led to infeasible computational demands. Splitting training into several stages satisfies the immediate practical needs, but having several components in the pipeline disperses the efforts in architecture tuning and complicates downstream tasks, like editing or distillation.

For example, a latent diffusion model (LDM) trains a diffusion model in the latent space of an autoencoder, which requires extensive separate tuning. The search for an optimal design for LDM is still ongoing. Moreover, each auto-encoder retraining requires retraining of the subsequent diffusion generator, resulting in additional computational expenses. Also, having multiple components complicates downstream applications. For example, SnapFusion had to use two unrelated sets of techniques to distill the generator and the auto-encoder separately.

A cascaded diffusion model (CDM) sequentially trains several diffusion generators of increasing resolution, where each next model is conditioned on the outputs of the previous one. This framework enjoys a more independent nature of its components, where each generator can be retrained independently from the rest, but it has more modules in the pipeline (e.g., Imagen Video consists of 7 video generators) and is more expensive at inference time. In this way, a unified end-to-end design is a highly desirable property of a diffusion generator, from both practical importance and conceptual elegance.

An obstacle in moving diffusion models into end-to-end applications is an increased computational burden. One of the recent attempts to mitigate this is patch-wise synthesis where a patch-wise model is trained to generate patches of real signals instead of their full-scale versions, greatly decreasing the computational cost and potentially unlocking end-to-end training. However, existing patch-wise diffusion models still partially rely on full-resolution training, which limits their scalability to very high resolutions.

Thus, high-level diffusion-based architectural paradigms include two main conceptual paradigms on how to structure a high-resolution diffusion-based generator: latent diffusion models (LDMs) and cascaded diffusion models (CDMs). For CDMs, it has been shown that the cascade can be trained jointly, but scaling for high resolutions or videos still requires progressive training from low-resolution models to obtain competitive results.

The rise of diffusion models as foundational image generators has led to exploration of diffusion models for video synthesis as well. Video diffusion models (VDMs) have been demonstrated to be scalable for conditional and unconditional video generation using the cascaded diffusion approach. A video implicit diffusion model (VIDM) designs a separate module to implicitly model motion. A video probabilistic diffusion model (VPDM) trains a diffusion model in a spatially decomposed latent space. Make-A-Video uses a vast unsupervised video collection in training a text-to-video generator by fine-tuning a text-to-image generator. PYoCo and VideoFusion techniques design specialized noise structures for video generation, while others have explored training of a foundational video generator on limited resources by fine-tuning a publicly available StableDiffusion model for video synthesis. Another line of research includes the adaptation of the foundational image or video generators for downstream tasks, such as video editing or 4-dimensional (4D) generation. However, none of these models is end-to-end and all follow cascaded or latent diffusion paradigms.

Patch-wise generation has a long history in GANs and has been applied in image, video, and 3D synthesis. In the context of diffusion models, patch-wise inference has been explored to extend foundational text-to-image generators to higher resolutions than what they had been trained on. Also, a regular video diffusion model can be inferred in an autoregressive manner at the test time because it can be easily conditioned on its previous generations via classifier guidance or noise initialization, and this kind of synthesis can also be seen as a patch-wise generation. Also, later stages of cascaded DMs sometimes operate in a patch-wise fashion even though they have not been trained for such an inference scheme. Cascaded DMs may design patch-wise sampling strategies with better global consistency in the resulting samples and thus could be employed as an image generator.

It has been shown that a diffusion model may be trained on a single image to produce its variations. PatchDiffusion explores direct patch-wise training of diffusion models. However, the downside of the PatchDiffusion approach is that the model operates on full-size inputs in 50% of the optimization steps, which is computationally infeasible for high-resolution signals. The full-size inputs are needed in the PatchDiffusion approach to help the model preserve the global consistency of the generated image.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1A:
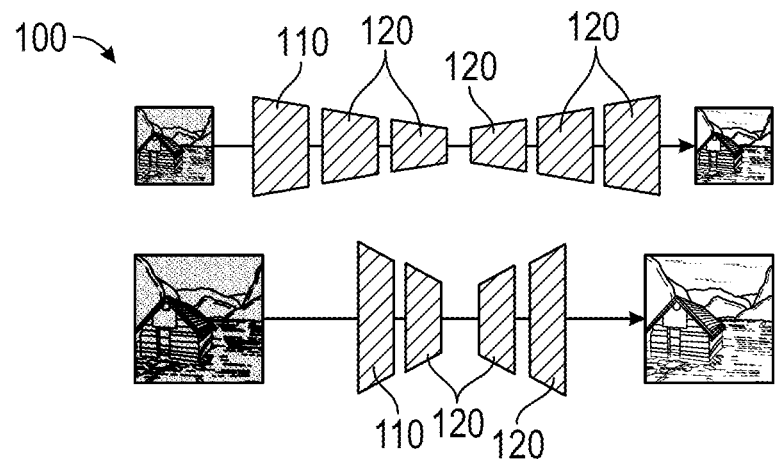
FIG. 1A is a diagram illustrating cascaded diffusion.

Scaling diffusion models to high-resolution video datasets breaks their end-to-end design and makes them consist of multiple independent modules, which limits their scalability and complicates downstream applications. The following description is directed to hierarchical patch-wise diffusion models (HPDMs) that address such shortcomings of diffusion models by providing a diffusion paradigm that learns a hierarchical distribution of patches instead of whole videos for efficient patch-wise training of diffusion models. The HPDMs described herein do not operate on inputs in their full resolution, which makes them substantially more efficient and enables end-to-end training on long, high-resolution video datasets. To enforce consistency between the patches, deep context fusion may be used to propagate the context information from low-scale to high-scale patches in a hierarchical manner. To accelerate patch-wise training and inference, adaptive computation also may be used to allocate more computational resources and network capacity towards coarse image details and to cheapen synthesis of high-frequency texture details.

The rationale for providing additional full-resolution supervision during training to a "classical" or prior art patch-wise DM is to enforce global consistency in its generated samples. HPDMs use a different approach to achieve this. The patch-wise diffusion is structured in a hierarchical manner, where all the stages of the processing pyramid are jointly trained to provide spatially aligned global context to the higher levels of the cascade. As a result, the model does not operate on the full-resolution inputs, which allows the model to be trained on high-resolution video datasets in an end-to-end fashion.

In sample configurations, a method and a computer readable storage medium comprising instructions that may be executed by a processor are provided to generate images using a hierarchical patch-wise diffusion model (HPDM). The method includes providing an input image or video in a hierarchical cascade-like structure including pipeline processing stages and patches that scale to decrease exponentially for each subsequent processing stage. Each patch comprises a continuous subgrid of pixel values extracted from the image or video that have the same resolution and include global information including a description of the image or video. The image or video is sampled to extract a hierarchy of patches that are provided as input to the hierarchical patch-wise diffusion model in such a way that a patch is located inside any previous patches so that the previous patches provide context information for each next stage of the processing stages of the HPDM. A combination of patches and corresponding noise maps are provided to train the hierarchical patch-wise diffusion model to denoise all patches jointly. Activations of lower resolution images of each processing stage are bilinearly (for images) or trilinearly (for videos) upsampled to generate next-stage patches at higher resolutions relative to a previous processing stage such that the next-stage patches are globally coherent. A synthesized image or video is generated from a processing stage patch by patch.

In the sample configurations, the sampling may include grid sampling activations of the image or video with bilinear or trilinear interpolation from any previous processing stages, averaging resulting grid sampled activations from previous processing levels, concatenating averaged grid sampled activations to create spatially aligned features of the image or video, and providing the spatially aligned features to a processing stage of a recurrent interface network to create an activation tensor representative of normal network features of the image or video. The sampling also may include sampling patches using hierarchical overlapped sampling whereby the patches are sampled such that coordinates overlap between neighboring patches.

In the sample configurations, deep context fusion may be applied to condition a subsequent processing stage on spatially aligned, globally pooled features of any previous processing stages by pooling context information from previous processing stages into an input of the subsequent processing stage.

Training the hierarchical patch-wise diffusion model to denoise all patches jointly may include exponentially reducing input noise scaling at each subsequent processing stage. In addition, activations from previous processing stages may be cached during inference.

In other sample configurations, adaptive computation may be applied to successive processing stages whereby a subset of processing stages operate on high-resolution patches and low-resolution patches are processed by each processing stage. Adaptive computation may include, for example, skipping processing of high-resolution activations in at least one processing stage of a recurrent interface network (RIN).

In the sample configurations, the HPDM is built on a base architecture including a RIN comprising a linear image tokenizer, followed by a sequence of identical attention-only pipeline processing stages and a linear detokenizer adapted to transform image tokens to red, green, blue (RGB) pixel values. A processor may be provided that is adapted to provide an input image or video as an input to the RIN during training. The input processor may process the input image or video to create a hierarchical cascade-like structure including processing stages and patches that scale to decrease exponentially for each subsequent processing stage of the RIN. Each patch may include a continuous subgrid of pixel values extracted from the image or video that have a same resolution and include global information including a description of the image or video. The input processor may further sample the image or video to extract a hierarchy of patches that are provided as input to subsequent processing stages of the RIN in such a way that a patch is located inside any previous patches so that the previous patches provide context information for the each next stage of the RIN. The RIN may provide a combination of patches and corresponding noise maps to denoise all patches jointly, bilinearly (for images) or trilinearly (for videos) upsample activations of lower resolution images of each processing stage to generate next-stage patches at higher resolutions relative to a previous processing stage, wherein the next-stage patches are globally coherent, and generate a synthesized image or video from a processing stage patch by patch.

Figure 1B:
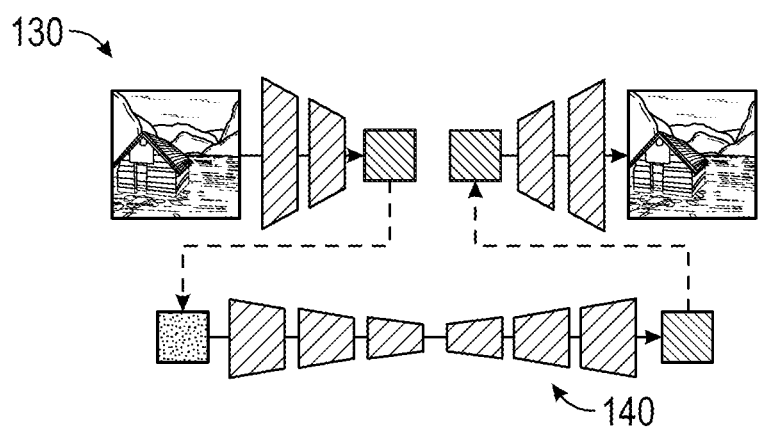
FIG. 1B is a diagram illustrating latent diffusion.
Figure 1C:
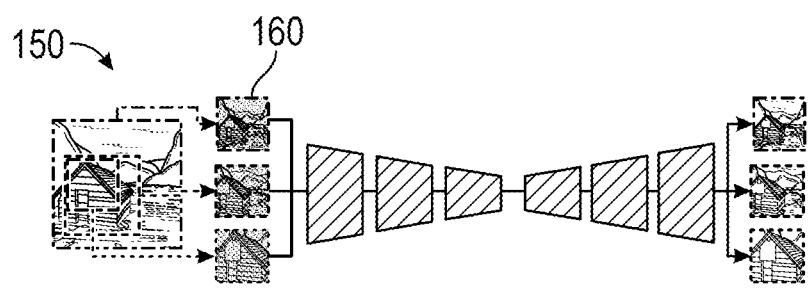
FIG. 1C is a diagram illustrating patch-wise diffusion.

FIGS. 1A-1C compare existing diffusion paradigms including cascaded diffusion (FIG. 1A), latent diffusion (FIG. 1B), and patch-wise diffusion FIG. 1C).

In cascaded diffusion 100 (FIG. 1A), the first model 110 is a class-conditional diffusion model that receives a noisy image and the class label as input. The remaining models 120 in the pipeline are class-conditional super-resolution models that receive the noisy image, the class label, and an additional upsampled low-resolution image as input. The downsampling/upsampling blocks 120 adjust the image input resolution N×N by a factor of 2 through each of the blocks. In latent diffusion 130 (FIG. 1B), a cross-attention mechanism 140 is used to augment the diffusion model. The cross-attention mechanism 140 includes learnable project matrices that are used to condition the diffusion model. In patch-wise diffusion 150 (FIG. 1C), the image is broken into patches 160 for processing by the diffusion model.

In the case of hierarchical patch-wise diffusion models (HPDMs) as described herein, the HPDM does not operate on full-resolution inputs as is the case with the diffusion models of FIGS. 1A-1C. Instead, HPDMs optimize the lower processing stages of the hierarchy to produce spatially aligned context information for the later pyramid processing levels to enforce global consistency between patches.

HPDMs are described herein in the context of video generation. For videos, the computational burden of high resolutions is considerably more pronounced than for images. A hierarchical patch-wise generator may rely on deep context fusion to allow computationally feasible training on high-resolution datasets. To improve both the qualitative performance and computational efficiency of HPDM, both context fusion and adaptive computation may be used.

Deep context fusion conditions the generation of higher-resolution patches on grid-sampled, positionally aligned features from the lower levels of the processing pyramid. It serves as an elegant way to incorporate global context information into synthesis of higher-frequency textural details and to facilitate knowledge sharing between the stages. As will be demonstrated, deep context fusion allows computationally feasible training on high-resolution datasets.

Adaptive computation restructures the model architecture in such a way that only a subset of layers operates on high-resolution patches, while more difficult low-resolution ones go through the whole pipeline.

The techniques described herein are applied to the attention-based recurrent interface network (RIN), and the techniques are benchmarked on two video generation datasets: UCF-101 in the 64×256² resolution and an internal dataset of 25M text/video pairs for 64×288×512 text-to-video generation. As will be shown below, HPDM achieves state-of-the-art performance on UCF-101 and demonstrates strong scalability performance for large-scale text-to-video generation.

Diffusion Models

Given a dataset $X=\{x^{(n)}\}_{n=1}^{N}$, including N samples $x^{(n)} \in \mathbb{R}^d$ (most commonly images or videos), it is desired to recover the underlying data-generating distribution $x^{(n)} \sim p(x)$. The general design of time-continuous diffusion models is followed whereby a neural network $D_\theta(\tilde{x}; \sigma)$ is trained to predict ground-truth dataset samples x from their noised versions $\tilde{x}=x+\varepsilon$, $\varepsilon \sim \mathcal{N}(0, \sigma I)$:

$$\mathbb{E}_{x,\varepsilon,\sigma}\left[\|D_\theta(\tilde{x}; \sigma) - x\|_2^2\right] \to \min_\theta \quad (1)$$

In Equation (1), p(σ) controls the corruption intensity and its distribution parameters are treated as hyperparameters. The denoising network can serve as a score predictor as follows:

$$s_\theta(x, \sigma) \triangleq \nabla_x \log p(x) \approx \frac{1}{\sigma^2}(D_\theta(x; \sigma) - x). \quad (2)$$

For large enough σ, the corrupted sample $\tilde{x}$ is indistinguishable from pure Gaussian noise, and this allows employment of the score predictor for sampling at test-time using Langevin dynamics (with σ→0 and T→∞):

$$\tilde{x}_t = \tilde{x}_{t-1} + \frac{\sigma}{2}s_\theta(\tilde{x}, \sigma) + \varepsilon_t. \quad (3)$$

Patch-Wise Diffusion Models

The training objective of patch-wise diffusion is similar to the regular diffusion design, but instead of full-size videos (or images) $x \in \mathbb{R}^{R_f \times R_h \times R_w}$, it uses randomly subsampled patches $p \in \mathbb{R}^{r_f \times r_h \times r_w}$ and trains the patch-wise model $D_\theta(\tilde{p}; \sigma)$ to denoise them:

$$\mathbb{E}_{p,\varepsilon,\sigma}\left[\|D_\theta(\tilde{p}; \sigma) - p\|_2^2\right] \to \min_\theta. \quad (4)$$

The patch extraction procedure extracts the pixels using random scales $s \in [r/R, 1]$ and offsets $\delta=(\delta_f, \delta_h, \delta_w)$, $\delta \in [0,1-s]$:

$$p = \text{downsample}(\text{crop}(x; \delta); r), \quad (5)$$

where the crop function slices the input signal given the pixel offsets δ, and downsamples to resize it to the specified resolution $r=(r_f, r_h, r_w)$.

Setting patch resolutions $r_f$, $r_h$, $r_w$ lower than original ones $R_f$, $R_h$, $R_w$ leads to drastic improvements in computational efficiency, but worsens the global consistency of the generated samples. As noted above, variable-resolution training has been used where 50% of the optimization steps are performed on full-size inputs to improve the consistency. The downside of such a strategy is that it undermines computational efficiency. For example, for a large enough video, the model cannot fit into GPU memory even for a batch size of 1. Instead, as described below, consistent generation can be achieved using HPDM with deep context fusion by conditioning higher resolution generation on the activations (i.e., representations of normal network features) from previously generated stages.

Recurrent Interface Networks

Recurrent Interface Networks (RINs) are used as a base architecture due to their simplicity and expressivity. A typical RIN network has a uniform structure and consists of a vision transformer (ViT)-like linear image tokenizer, followed by a sequence of identical attention-only processing blocks and a linear detokenizer to transform the image tokens back to the red, green, blue (RGB) pixel values. RIN processing blocks (stages) do not employ an expensive self-attention mechanism and instead rely on linear cross-attention layers with a set of learnable latent tokens. This allows RIN to scale gracefully with input resolution without sacrificing communication between far-away input locations.

Method

The patch-wise diffusion design described herein is different from PatchDiffusion in that HPDM does not operate on the full input resolution. Instead, it uses a hierarchical cascade-like structure including L pipeline processing stages and patch scales Se that decrease exponentially: $s_\ell = 1/2^\ell$ for $\ell \in \{0, 1, \ldots, L\}$ for each subsequent stage. The patches represent a small part of subsampled pixels (e.g., subsampled with trilinear interpolation of 8 neighboring pixels) of the image frame in the form of a continuous subgrid of pixel values (x, y, t) extracted from the image or video that are always of the same resolution $r=(r_f, r_h, r_w)$, which leads to substantial memory and computational savings compared to full-resolution training. During training, a video from the dataset is randomly sampled and a hierarchy of patches having coordinates $c_0, \ldots, c_L$ are extracted and provided as input in such a way that the $\ell$-th patch (represented by the coordinates of the patch within the image frame) is always located inside the previous $\ell' < \ell$ patches so that they provide the necessary context information. By denoting a combination of these patches as $P=(\mathcal{N})$ and the corresponding noise maps $\sigma = (\sigma_\ell)_{\ell=0}^L$, hierarchical patch-wise diffusion is trained to denoise them all jointly:

$$\mathbb{E}_{p,\varepsilon,\sigma}[\|D_\theta(\tilde{P}_0; \sigma) - P\|_2^2] \to \min_\theta, \quad (6)$$

where each patch is corrupted independently: $\tilde{P}=(\tilde{p}_\ell + \varepsilon_\ell)_{\ell=0}^L$, $\varepsilon_\ell \sim \mathcal{N}(0, \sigma_\ell, I)$. Restricting the information flow in the coarse-to-fine manner allows inference to be performed at test-time in a cascaded diffusion fashion.

Figure 2A:
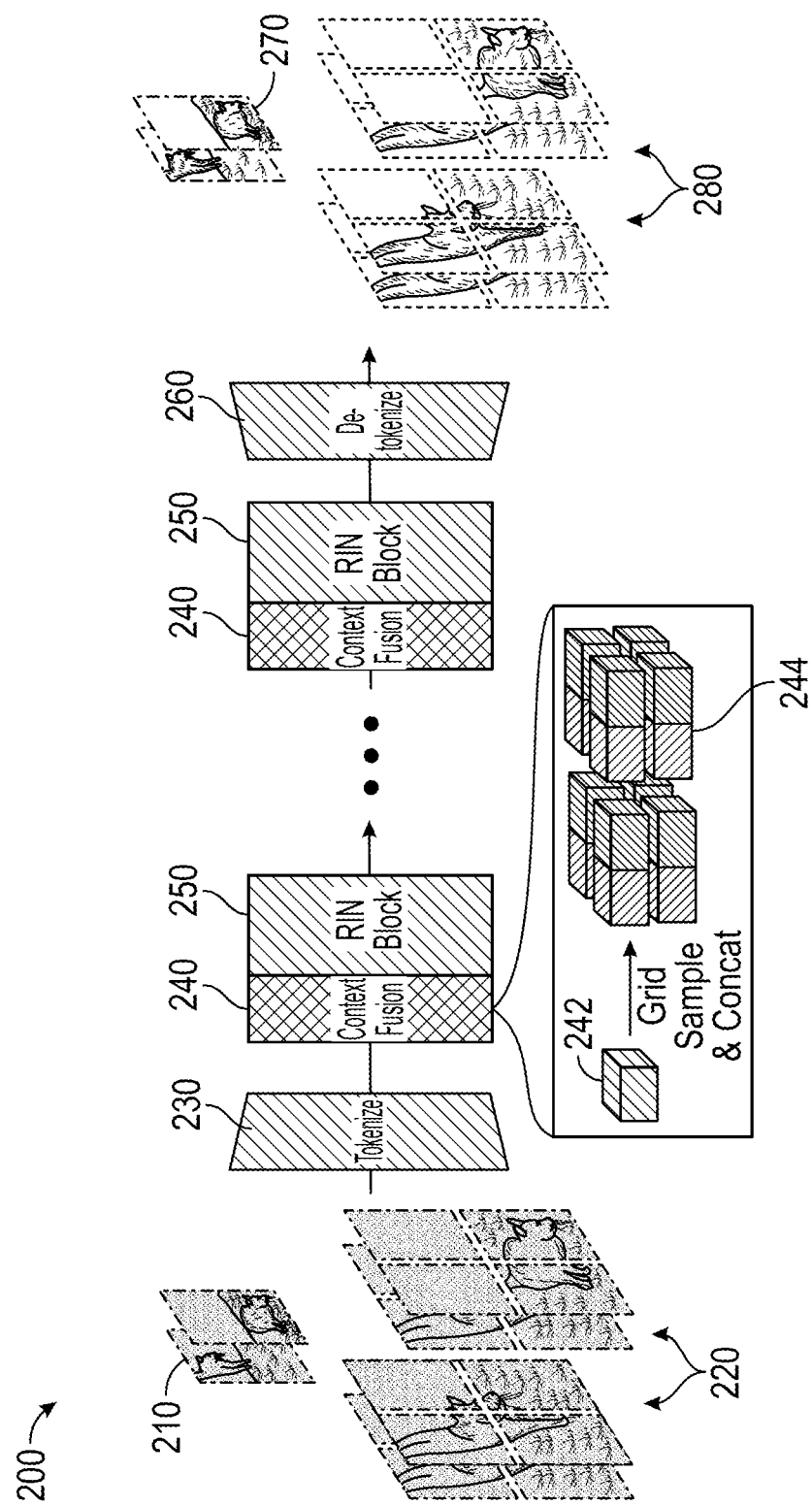
FIG. 2A is a diagram providing an architectural overview of the hierarchical patch-wise diffusion model for a 2-level type video processing pyramid in a sample configuration.

FIG. 2A is a diagram providing an architectural overview of the hierarchical patch-wise diffusion model (HPDM) 200 for a 2-level type video pipeline processing pyramid in a sample configuration. The HPDM is an end-to-end diffusion model that is able to train on high-resolution videos directly in the pixel space. The HPDM is trained to denoise all the patches jointly. During training, only a single patch from each pyramid level is used and information propagation is restricted in a coarse-to-fine manner. This allows the whole video to be synthesized at a given pyramid stage patch-by-patch at test-time.

The HPDM 200 starts with low resolution images 210 and upsampled patches 220 that are tokenized by a linear image tokenizer 230 of the RIN. The tokenized images are provided to a context fusion block 240 where the tokenized images are grid sampled at 242 and concatentated at 244 to create spatially aligned features that are provided to the RIN attention-only processing stage 250 to create an activation tensor representative of normal network features. The context fusion block 240 and RIN processing stage 250 may be cascaded in a hierarchical fashion before the resulting image features are detokenized using a linear tokenizer 260 of the RIN to create the low resolution images 270 and upsampled patches 280.

In sample configurations, a low resolution patch is generated as input for training. The low resolution patch includes global information including a description of the entire image or video that is provided as an internal representation to a neural network. For example, the position and orientation of an object in an image or video is identified and stored in the neural network. The neural network may generate a lower resolution version of the image in multiple stages, both temporally and spatially (e.g., 1×1×1→2×2×2→4×4×4→8×8×8). The lower resolution images are interpolated and expanded to generate larger patches that are globally coherent. For example, each patch may be upsampled twice. Importantly, the interpolation is conditioned on neural network activations whereby the activations are interpolated—not the R,G,B values—to provide more information about neighboring context. The encoder produces the activations, as opposed to color values, by extracting features from the image in accordance with the neural network objective and the dataset received. The extracted features are thus used in place of color values as in traditional processing.

As will be described further below, the HPDM method in a sample configuration includes three fundamental components that allow a patch-wise paradigm to achieve state-of-the-art results in video generation: deep context fusion, adaptive computation, and hierarchical overlapped sampling.

Deep Context Fusion

The main struggle of patch-wise models is preserving the consistency between the patches, since each patch is modeled independently from the rest, conditioned on the previous pyramid stage. Cascaded DMs provide the conditioning to later stages by simply concatenating an upsampled low-resolution video channel-wise to the current latent. While it can provide the global context information when the model operates on a full-resolution input, for patch-wise models, this leads to drastic context cut-outs, which severely worsens the performance. Also, it limits the knowledge sharing between lower and higher stages of the cascade. To mitigate this, deep context fusion (DCF) is implemented in sample configurations. DCF is a context fusion strategy that conditions the higher stages of the pyramid on spatially aligned, globally pooled features of the previous stages.

For DCF, before each RIN processing stage of the HPDM, the global context information from previous stages is pooled into its inputs. For this, the patch coordinates are used to grid-sample the activations at 242 (FIG. 2A) with trilinear interpolation from all previous pyramid stages, average them, and concatenate them at 244 (FIG. 2A) to the current-stage features.

More precisely, for a given patch b-th block inputs $a_\ell^{b-1} \in \mathbb{R}^{d \times r'_f \times r'_h \times r'_w}$ with coordinates $c_\ell = (s, \delta_f, \delta_h, \delta_w) \in \mathbb{R}^4$ at the $\ell$-th pyramid level; $\ell - 1$ context patches' activations $(a_k^{b-1})_{k=1}^{\ell-1}$ with respective coordinates $(c_k)_{k=1}^{\ell-1}$, the context ct $\mathsf{X}_\ell \in \mathbb{R}^{d \times r'_f \times r'_h \times r'_w}$ is computed at 242 as:

$$ctx_\ell^b = \frac{1}{\ell - 1} \sum_{k=1}^{\ell-1} \text{grid\_sample}_{3D}[a_{\ell-1}^{b-1}, \hat{c}_\ell], \quad (7)$$

where grid_sample$_{3D}$ is a function that extracts the features with trilinear interpolation via the coordinates queries, and $\hat{c}_\ell$ are the recomputed patch coordinates (for k < $\ell$) calculated as:

$$\hat{c}_\ell(c_\ell, c_k) = [s_\ell/s_k; (\delta_\ell - \delta_k)/s_k]. \quad (8)$$

This context information is fused via simple channel-wise concatenation at 244 together with the coordinates information $c_\ell$ which were found to be slightly improving the consistency:

$$\text{fuse}[a_\ell^{b-1}, c_\ell; \{a_k^{b-1}, c_k\}_{k=1}^{\ell-1}] = \text{concat}[a_\ell, ctx_\ell, c_\ell]. \tag{9}$$

Figure 2B:
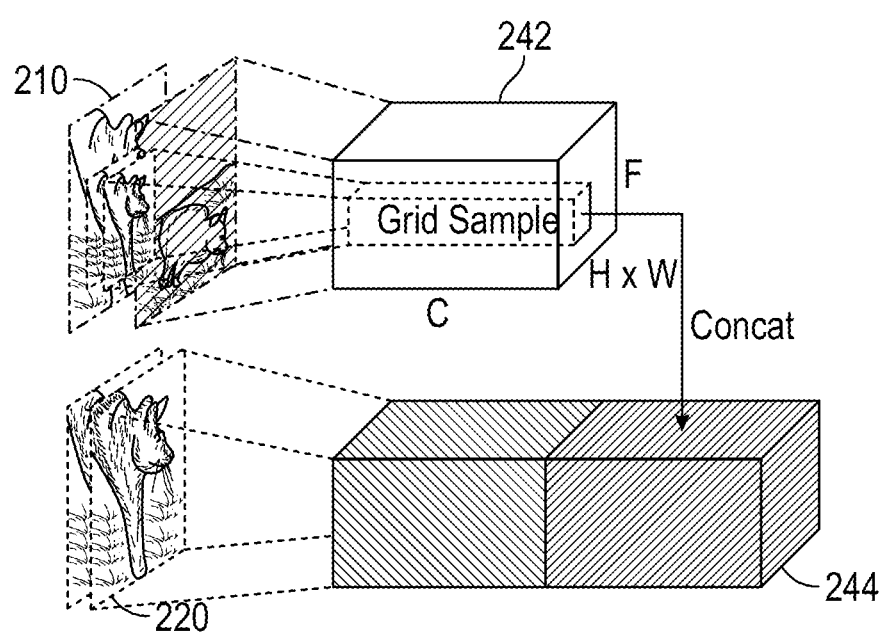
FIG. 2B is a diagram illustrating deep context fusion, which aggregates the global context information from the coarse patch in a spatially aligned manner and propagates it further in the hierarchy to a higher-level patch in a sample configuration.

FIG. 2B is a diagram illustrating deep context fusion, which aggregates the global context information from the coarse patch in a spatially aligned manner and propagates it further in the hierarchy to a higher-level patch in a sample configuration. In deep context fusion, the channel dimensionality variables C, F, H, W denote the feature dimensionality and the length/height/width of the activations tensor that is grid sampled at 242, concatenated at 244, and propagated by the RIN processing stage 250. Features are blocked based on internal activations of normal network features, where the activations represent features of the training image.

To keep the dimensionalities the same across the network, the resulted tensor $\text{fuse}[\bullet] \in \mathbb{R}^{(2d+3) \times r'_p \times r'_h \times r'_w}$ is projected with a learnable linear transformation. Other aggregation strategies, like concatenating all the levels' features or averaging may be considered, but the former one blows up the dimensionalities, making the training expensive, while the latter one was found to lead to poor performance during experimentation.

An additional advantage of DCF compared to shallow context fusion of regular cascaded DMs is that the gradient can flow from the small-scale patch denoising loss to the lower levels of the hierarchy, pushing the earlier cascade stages to learn such features that are more useful to the later ones. This was found to be helpful in practice and to improve the overall performance by approximately an additional 5%.

Adaptive Computation

Naturally, generating high-resolution details is considered to be easier than synthesizing the low-resolution structure. In this way, allocating the same amount of network capacity on high-resolution patches can be excessive. This is why it is desired to use only some of the computational processing blocks when running the last stages of the pyramid. This strategy is referred to herein as adaptive computation. Adaptive computation has been found to improve the efficiency of the HPDM by approximately 60% without compromising the performance, as shown in Table 2 below. The uniform RIN's structure (i.e., all the processing blocks are identical and have the same input/output resolutions) allows adaptive computation to be easily implemented. One simply skips some of the earlier processing blocks when processing the high-resolution activations. High-level pseudo-code for adaptive-computation in the Python language may appear as follows:

```
def       adaptive_computation (
          blocks: List[RINBlock],
          x: Tensor,
          num_levels_per_block: List[int]
)         -> Tensor:
#         'x' has the shape: [B, L, D, F, H, W]
for blk_idx, blk in enumerate(blocks):
          nlvl: int = num_levels_per_block[blk_idx]
          x[:, :nlvl] = blk(x[:, :nlvl])
```

Adaptive computation involves two design choices: whether it is the earlier processing blocks that should process per pyramid stages or the later ones, and how to distribute the computation assignments among the processing blocks per each pyramid stage. The inventors chose to allocate the later processing blocks to perform full computation to make the low-level context information go through more processing before being propagated to the higher stages. For the block allocations, it was observed that simply increasing the computation assignments linearly with the processing block index worked well in practice and that random samples from videos worked as well as cherry-picked samples from videos.

Hierarchical Overlapped Sampling

Sampling for HPDM is different from regular diffusion sampling, since it is patch-wise and does not operate on full-resolution inputs. During inference, pyramid levels are generated one-by-one, starting from $r_f \times r_h \times r_w$ video (corresponding to a patch of scale s=1), then using the pyramid levels to generate the video of resolution $2r_f \times 2r_h \times 2r_w$ (corresponding to patch scale s=½), and so on until the final video of full resolution $R_f \times R_h \times R_w$ is produced.

Each next stage of the pyramid uses the generated video from the previous stage through the deep context fusion technique described above. DCF provides strong global context conditioning, but sometimes is not enough to enforce local consistency between two neighboring patches. To mitigate this, the MultiDiffusion strategy may be deployed where the score predictions $s_\theta(\hat{p}, \sigma)$ are simply average-overlapped during the denoising process. More concretely, to generate a complete video $x \in \mathbb{R}^{R_f \times R_h \times R_w}$, $(2R_f - 1) \times (2R_h - 1) \times (2R_w - 1)$ patches are first generated with 50% of the coordinates overlapping between two neighboring patches. Then, the reverse diffusion process for each patch is run and the overlapping regions of the corresponding score predictions are averaged. The importance of overlapped inference is illustrated in Table 3 below.

Miscellaneous Techniques

From implementation and engineering standpoints, there are several other techniques that may play an important role in bolstering the performance of the HPDM. For example, the inventors noticed that sampling a patch on the L-th cascade level at integer coordinates allows prevention of blurry artifacts in generated videos that appear due to oversmoothness effects of trilinear interpolation. Also, each stage of the pyramid has been observed to operate on different frequency signals, and higher levels of the pyramid have stronger correlations between patch pixels. The inventors found it helpful to use exponentially smaller input noise scaling with each increase in pyramid level. In addition, during inference, it was found that there is no need to recompute all the activations for the previous pyramid stages, which makes it possible to cache them. Caching block features allowed the inference to be sped up by approximately 40%. However, for the large model, caching may need to be implemented with CPU offloading to prevent GPU out-of-memory errors.

During implementation, RINs were used instead of U-Nets as the backbone since the uniform structure of RINs is conceptually simpler and aligns well with adaptive computation. v-prediction parametrization was used with extra input scaling. Following RINs, the HPDM was trained with the LAMB optimizer with the cosine learning rate schedule and a maximum learning rate (LR) of 0.005. In a sample configuration, the HPDM has 6 RIN processing stages 250, and the load is distributed for adaptive computation as [1, 1, 2, 2, 3, 4]: e.g., the 1st and 2nd processing blocks only compute the first pyramid level, the 3rd and $4^{th}$ processing blocks only compute the first two levels of the pyramid, and so on. Not using adaptive computation is equivalent to having a load of [4, 4, 4, 4, 4, 4], which is almost twice as expensive. During experimentation, 768 latent tokens of 1024/3072 dimensionality with 1×4×4 pixel tokenization for class-conditional/text-conditional experiments, respectively, were used. To encode the textual information, the inventors relied on the T5 language model and used its T5-11B variant.

Figure 3A:
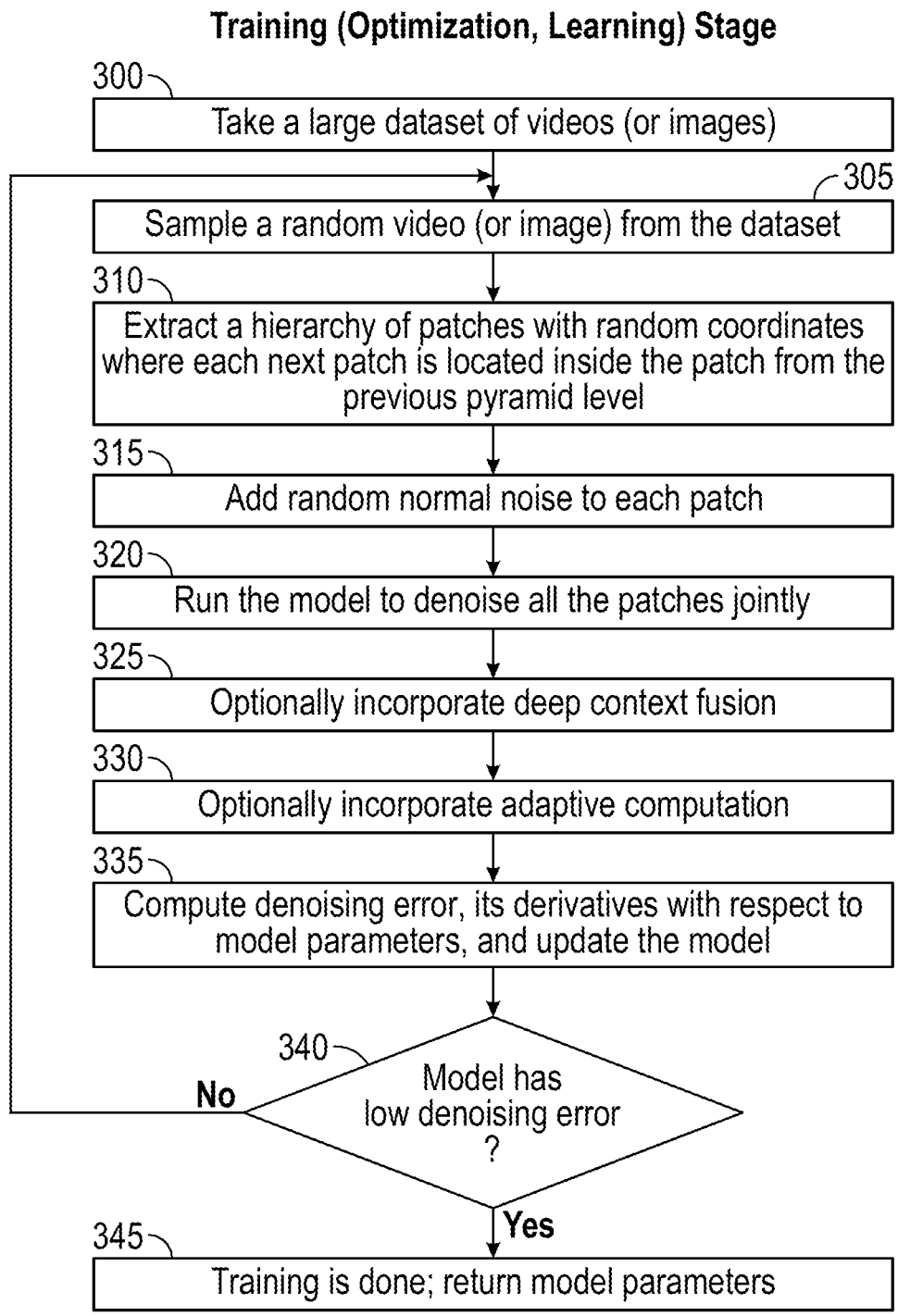
FIG. 3A is a flow chart of a method for training a hierarchical patch-wise diffusion model in a sample configuration.

FIG. 3A is a flow chart of a method for training (e.g., optimization and learning) a hierarchical patch-wise diffusion model (HPDM) in a sample configuration.

As described above, the input image or video is provided at 300 in the form of a hierarchical cascade-like structure including L stages and patches that scale so as to decrease exponentially for each stage. The patches represent a small part of subsampled pixels of the image frame in the form of a continuous subgrid of pixel values extracted from the image or video that are always of the same resolution and include global information including a description of the entire image or video.

During training, an image or video from the dataset is randomly sampled at 305 and a hierarchy of patches are extracted at 310 and provided as input to the HPDM in such a way that the $\ell$-th patch (represented by the coordinates of the patch within the image frame) is always located inside the previous patches from any previous processing stages so that they provide the necessary context information. For example, the image or video is grid sampled and concatenated to create spatially aligned features, as opposed to color values, that are provided to an RIN processing block to create an activation tensor representative of normal network features. Optionally, the patches are sampled using hierarchical overlapped sampling whereby the patches are sampled such that the coordinates overlap between neighboring patches.

Random normal noise is added to each patch as noise maps at 315, and the HPDM is run to denoise all the patches jointly at 320. Optionally, smaller input noise scaling may be used with each increase in processing level.

Optionally, deep context fusion is incorporated at 325 to condition subsequent processing stages on spatially aligned, globally pooled features of the previous stages by pooling the global context information from previous stages into the inputs of subsequent stages. As noted above, for deep context fusion, the patch coordinates are used to grid-sample the activations with trilinear interpolation from all previous pyramid stages, average them, and concatenate them to the current-stage features.

If further pyramid stages are available, adaptive computation is optionally incorporated at 330, and the denoising error and its derivatives with respect to the model parameters are computed at 335. The HPDM is then updated.

If it is determined at 340 that the HPDM has a sufficiently low denoising error, the training is completed at 345, and the model parameters are returned. On the other hand, if the HPDM does not have a sufficiently low processing error at 340, the training process is repeated.

Figure 3B:
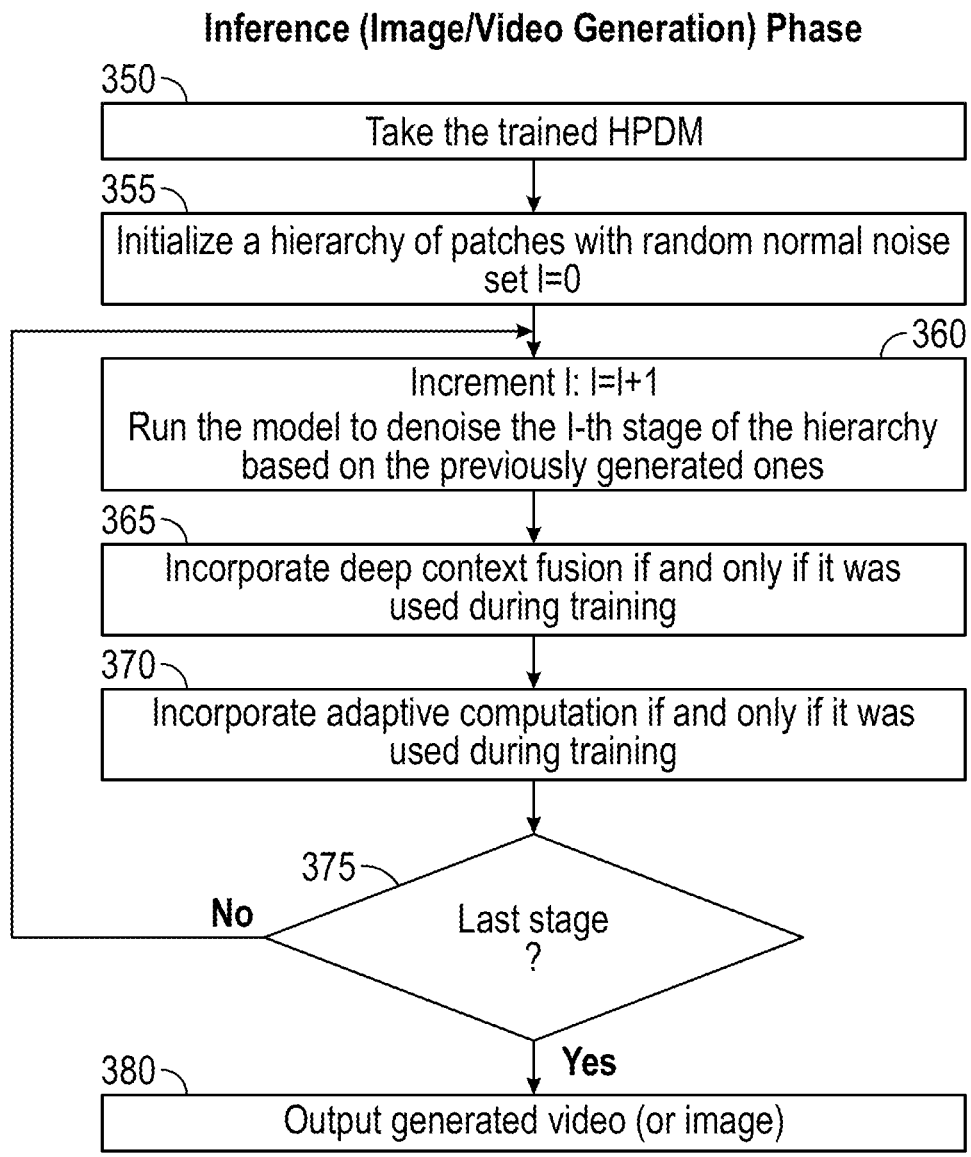
FIG. 3B is a flow chart of an inference phase for generating images or videos using a hierarchical patch-wise diffusion model in a sample configuration.

FIG. 3B is a flow chart of an inference phase for generating images or videos using a hierarchical patch-wise diffusion model (HPDM) in a sample configuration.

For inference, the HPDM trained using the training process of FIG. 3A is provided at 350. A hierarchy of patches with random normal noise is initialized at 355, and l is set to 0 (i.e., l=0).

The model increments the value of l (i.e., l=l+1) and the HPDM is run at 360 to denoise the l-th stage of the hierarchy based on the previously generated stages.

Deep context fusion is incorporated at 365 if and only if deep context fusion was used during training. Also, adaptive computation is incorporated at 370 if and only if adaptive computation was used during training.

If it is determined at 375 that all processing stages have been processed, the generated image or video is output at 380. Otherwise, the inference process is repeated.

The information flow is thus restricted in a coarse-to-fine manner to allow inference to be performed at test-time in a cascaded diffusion fashion.

Experiments

Two datasets were considered for training the HPDM: 1) UCF101 (for exploration and ablations) and 2) an internal video dataset adapted to train a large-scale text-to-video model. UCF101 is a popular academic benchmark for unconditional and class-conditional video generation consisting of videos of 240×320 resolution with 25 frames per second (FPS) and an average video length of approximately 7 seconds. On the other hand, the internal video dataset consists of approximately 25M high-quality text/video pairs in the style of stock footage with manual human annotations and approximately 70M low-quality in-the-wild videos with automatically generated captions. Additionally, for the large-scale model training, an internal dataset of approximately 150M high-quality text/image pairs was used for extra supervision.

The HPDM was evaluated with two main video quality metrics: Frechet Video Distance (FVD) and Inception Score (IS). For FVD and IS, their values are reported based on 10,000 generated videos. For ablations, FVD@512 was used instead for efficiency purposes: an FVD variant computed on just 512 generated videos. FVD@512 was found to correlate well with the traditional FVD, but with just a fixed offset. Apart from that, the training throughput is reported for various designs of the network and the samples from the HPDM are provided for qualitative assessment.

Video Generation on UCF-101

The HPDM was trained for 80K steps with a batch size of 2048. For ablations, all the models were trained for 50K steps with a batch size of 512. UCF models are trained for the final video resolution of 64×256² with the pyramid 16×64²→32×128²→64×256².

In particular experiments, the patch-wise model was trained on UCF-101 for 64×256² generation entirely end-to-end with the hierarchical patch sampling procedure described above. Table 4 compares these results with recent state-of-the-art methods: MoCoGAN-HD, StyleGAN-V, TATS, VIDM, DIGAN, and PVDM. While the model is trained to synthesize 64 frames, quantitative results are reported for 16 generated frames, since it is a much more popular benchmark in the literature (for this, 16 frames were subsampled out of the generated 64). The model was shown to substantially outperform all previously reported results for this benchmark (i.e., for the 16×256² resolution and without pretraining) by a striking margin of more than 100%.

Table 1 below provides a comparison of these state-of-the-art methods on UCF-101 16×256² class-conditional video generation (where the DPDM is trained on 64×256² videos). It is noted that the Make-A-Video was pretrained on a large-scale text-to-video dataset.

TABLE 1

| Method | FVD ↓ | IS ↑ |
|---|---|---|
| DIGAN | 1630.2 | 29.71 |
| MoCoGAN-HD | 700 | 33.95 |

TABLE 1-continued

| Method | FVD ↓ | IS ↑ |
|---|---|---|
| StyleGAN-V | 1431.0 | 23.94 |
| TATS | 635 | 57.63 |
| VIDM | 294.7 | — |
| PVDM | 343.6 | 74.4 |
| Make-A-Video | 81.25 | 82.55 |
| HPDM | 80.47 | 86.47 |

Two lines of ablations were considered: ablating core architectural decisions and benchmakring various inference strategies, since the latter also crucially influences the final performance. For the training components, the influence of deep context fusion was first analyzed. For this, an experiment with "shallow context fusion" was launched whereby only the RGB pixels (non-averaged, only from the patch of the previous pyramid level) were concatenated as the context information. As can be seen from the results in Table 2 (first row), this strategy produces considerably worse results (though the training becomes approximately 10% faster).

The next ablation considered was whether the low-level pyramid stages indeed learn such features that are more useful for later pyramid stages, when they are directly supervised with the denoising loss of small-scale patches through the context aggregation procedure. For this ablation, the context variable ctx was detached from the autograd graph. The results are presented in Table 2 (second row). The performance is shown to be better for earlier pyramid stages, but the late stage suffers. This demonstrates that the lowest stage indeed learns to encode the global context in a way that is more accessible for later levels of the cascade, but by sacrificing a part of its capacity due to this.

The third row in Table 2 demonstrates how the model performs without adaptive computation. While not using adaptive computation allows slightly better results, it decreases the training speed by almost twice. The cost of the later pyramid stages becomes even more critical during inference time, when sampling high-resolution videos.

Finally, the existing observation that positional encoding in patch-wise models helps in producing more spatially consistent samples was verified. This can be seen from the worse FVD@512 scores in Table 2 (4th row) when no coordinates information is input to the model in context fusion (see Equation (9)).

Table 2 illustrates the results of ablating architectural components in terms of FVD scores and training speed measured as the videos/sec throughpout on a single NVidia A100 80 GB GPU.

TABLE 2

| Setup | FVD@512 $16 \times 64^2$ | FVD@512 $32 \times 128^2$ | FVD@512 $64 \times 256^2$ | Training speed ↑ |
|---|---|---|---|---|
| Shallow fusion | 298.9 | 411.9 | 467.0 | 4.91 |
| Context detach | 290.6 | 375.0 | 397.3 | 4.4 |
| No adaptive computation | 319.3 | 391.5 | 373.9 | 2.73 |
| No coordinates | 305.3 | 400.7 | 389.5 | 4.47 |
| Default model | 287.6 | 376.6 | 378.2 | 4.4 |

Table 2 illustrates the effect of the overlapped inference on the consistency between the patches. Surprisingly, even without full-resolution training and patch overlapping, the deep context fusion strategy described herein preserved strong consistency in the generated sample.

Table 3 provides the quantitative analysis for FVD@512 for various overlapped inference strategies.

TABLE 3

| Inference strategy | $32 \times 128^2$ | $64 \times 256^2$ |
|---|---|---|
| No overlapping | 385.40 | 475.05 |
| 50% w-overlapping | 367.10 | 452.79 |
| 50% h-overlapping | 383.15 | 467.36 |
| 50% h/w-overlapping | 382.25 | 456.10 |
| 50% f-overlapping | 380.63 | 460.74 |
| 50% f/w-overlapping | 398.77 | 492.84 |
| 50% f/h-overlapping | 360.46 | 436.81 |
| 50% f/h/w-overlapping | 381.85 | 467.37 |

Large-Scale Text-to-Video Generation

With the rise of foundational models, it is safe to say that the most important property of a generative model is its scalability: the ability to fit a huge in-the-wild dataset when scaled in terms of computation and the number of parameters. To explore the scalability of the patch-wise paradigm, a large-scale experiment for HPDM was launched with approximately 4B parameters on a text/video dataset consisting of approximately 95M samples. Since training foundational model incurs extreme financial costs, it was found to be financially less risky to fine-tune the model from a low-resolution 36×64 generator instead of training HPDM entirely from scratch. The fact that HPDM does not introduce many new parameters into the model and can be easily fine-tuned from a base low-resolution model serves as an additional benefit of the design. The large-scale HPDM was trained for the final output resolution of 64×288×512 with the pyramid 8×36×64→16×72×128→32×144×256→64×288×512 (4 pyramid levels in total). The base 36×64 generator was trained for 500k training steps, and the main model was trained for 15k training (3% of the base generator training steps) with a batch size of 4096. Apart from videos, joint image/video training was utilized. For image training with RINS, the image was repeated along the time axis to convert it into a still video.

The results were tested quantitatively by reporting zero-shot performance on UCF-101 in terms of FVD and IS in Table 4 and also qualitatively by providing visual comparisons with existing foundational generators. The developed generator was able to scale to high-resolution 64×288×512 text-to-video generation videos from complex in-the-wild datasets when fine-tuned from a low-resolution 36×64 generator for just 15k training steps. A convenient advantage of the design is that it does not introduce many new parameters into the base generator and can be easily fine-tuned from it. Thus, although trained for just 15k steps, HPDM was found to yield good results and has comparable generation quality to modern foundational text-to-video models including Image Video, Make-A-Video, and PYoCo on some text prompts.

Table 4 illustrates zero-shot performance on UCF-101. As shown, HPDM achieves competitive performance when fine-tuned from the low-resolution 36×64 generator for just 15k training steps.

TABLE 4

| Method | Resolution | FVD ↓ | IS ↑ |
|---|---|---|---|
| CogVideo | 128 × 128 | 701.6 | 25.27 |
| Make-A-Video | 256 × 256 | 367.2 | 33.00 |
| Magic Video | 256 × 256 | 655 | — |
| LVDM | 256 × 256 | 641.8 | — |

TABLE 4-continued

| Method | Resolution | FVD↓ | IS↑ |
|---|---|---|---|
| Video LDM | N/A | 550.6 | 33.45 |
| VideoFactory | 256 × 256 | 410.0 | — |
| PYoCo | 256 × 256 | 355.2 | 47.46 |
| HPDM | 72 × 128 | 299.3 | 20.53 |
| HPDM | 144 × 256 | 651.96 | 15.83 |

Although HPDM provides considerable improvements in video generation quality and enjoys a convenient end-to-end design, it still suffers from some limitations. For example, despite using overlapped inference, HPDM occasionally exhibits stitching artifacts. Inference strategies with stronger spatial communication, like classifier guidance, may be employed to mitigate them. Also, since HPDM generally follows the cascaded pipeline (with the difference that training is joint and more efficient), it suffers from the typical cascade drawback in that the errors made in earlier stages of the pyramid are propagated to the next. Also, "dead pixels" artifacts imply failures of the ViT-like pixel tokenization/detokenization procedure, where the model sometimes produces broken 4×4 patches. These artifacts are unique to RINs and were not experienced in experiments with UNets. However, since they do not appear catastrophically often, experimentation with RINs was continued. In addition, patch-wise inference requires more function evaluations at test time, which slows down the inference process. For an exponentially growing pyramid starting at 8×36×64 and ending at 64×288×512, with full (i.e., maximal) overlapping, $$(2 \cdot \frac{64}{8} - 1) \times (2 \cdot \frac{288}{36} - 1) \times (2\frac{512}{64} - 1) = 3375$$

patches need to be produced for a single reverse diffusion step. Adaptive computation with caching greatly accelerates this process, but it is still heavy.

It is noted that there are multiple inconsistencies in quantitative evaluation of video generators. For FVD on UCF101 (the most popular metric for it), there are differences in the amounts of fake/real videos used to compute the statistics, FPS values, resolutions, and real data subsets ("train" or "train+test"). To account for these differences, in Table 5 a comprehensive set of metrics is illustrated for easier assessment of HPDM's performance in comparison with existing video generators. In addition, Table 5 also includes additional models, HPDM-S (small) and HPDM-M (medium) in addition to HPDM-L (large), and also the results for the fixed version of the text-to-video HPDM model.

To compute real data FVD statistics, the training set of UCF-101 (around 9.5k videos in total) are used. The models were trained with a default 25 FPS resolution and trained for 64 frames. To compute the results for 16 frames, the first 16 frames were taken out of the sequence.

Table 5 illustrates additional FVD evaluation results for class-conditional UCF-101 video generation. "Pre-trained" denotes whether the model was pre-trained on an external dataset. "#samples" is the amount of fake videos used to compute the fake data statistics. The FVD scores computed for different amounts of samples were found to be well-correlated with one another. IS cannot be computed for 64-frames-long videos due to the design of the C3D model.

TABLE 5

| Method | Resolution | Pre-trained? | #samples | FVD↓ | IS↑ |
|---|---|---|---|---|---|
| DIGAN | 16 × 128 × 128 | N | 2,048 | 1630.2 | 00.00 |
| StyleGAN-V | 16 × 256 × 256 | N | 2,048 | 1431.0 | 23.94 |
| TATS | 16 × 128 × 128 | N | N/A | 332 | 79.28 |
| VIDM | 16 × 256 × 256 | N | 2,048 | 294.7 | — |
| LVDM | 16 × 256 × 256 | N | 2,048 | 372 | — |
| PVDM | 16 × 256 × 256 | N | 2,048 | 343.6 | — |
| PVDM | 16 × 256 × 256 | N | 10,000 | — | 74.40 |
| PVDM | 128 × 256 × 256 | N | 2,048 | 648.4 | — |
| VideoFusion | 16 × 128 × 128 | N | N/A | 173 | 80.03 |
| Make-A-Video | 16 × 256 × 256 | Y | 10,000 | 81.25 | 82.55 |
| HPDM -S | 16 × 256 × 256 | N | 2,048 | 370.50 | 61.50 |
|  | 16 × 256 × 256 | N | 10,000 | 344.54 | 73.73 |
|  | 64 × 256 × 256 | N | 2,048 | 647.48 | N/A |
|  | 64 × 256 × 256 | N | 10,000 | 578.80 | N/A |
| HPDM -M | 16 × 256 × 256 | N | 2,048 | 178.15 | 69.76 |
|  | 16 × 256 × 256 | N | 10,000 | 143.06 | 84.29 |
|  | 64 × 256 × 256 | N | 2,048 | 324.72 | N/A |
|  | 64 × 256 × 256 | N | 10,000 | 257.65 | N/A |
| HPDM -L | 16 × 256 × 256 | N | 2,048 | 92.00 | 71.16 |
|  | 16 × 256 × 256 | N | 10,000 | 66.32 | 87.68 |
|  | 64 × 256 × 256 | N | 2,048 | 137.52 | N/A |
|  | 64 × 256 × 256 | N | 10,000 | 101.42 | N/A |

Table 6 illustrates additional zero-shot FVD evaluation results for UCF-101. For zero-shot evaluation, it is assumed that the other works use 10,000 fake videos.

TABLE 6

| Method | Resolution | FVD↓ | IS↑ |
|---|---|---|---|
| CogVideo | 16 × 480 × 480 | 701.6 | 25.27 |
| Make-A-Video | 16 × 256 × 256 | 367.2 | 33.00 |
| Magic Video | 16 × 256 × 256 | 655 | — |
| LVDM | 16 × 256 × 256 | 641.8 | — |
| Video LDM | N/A | 550.6 | 33.45 |
| VideoFactory | 16 × 256 × 256 | 410.0 | — |
| PYoCo | 16 × 256 × 256 | 355.2 | 47.46 |
| HPDM-T2V | 16 × 144 × 256 | 383.26 | 21.15 |
|  | 16 × 256 × 256 | 728.26 | 23.46 |
|  | 16 × 288 × 512 | 481.93 | 23.77 |
|  | 64 × 256 × 256 | 1238.62 | N/A |
|  | 64 × 288 × 512 | 1197.60 | N/A |

In other training examples, the HPDM was trained in a patch-wise fashion with the patch resolution of 16×64×64 for UCF-101 and 8×36×64 for text-to-video generation. The HPDM was also trained on two smaller versions for fewer steps. The smaller versions are denoted as HPDM-S and HPDM-M, while the larger one is denoted as HPDM-L in Table 5. They differ in the amount of training steps performed and also the latent dimensionality of RINs: 256, 512 and 1024, respectively. The text-to-video model HPDM-T2V of Table 6 was trained for 15k steps. The hyperparameters for different variations of HPDM are shown in Table 7 below. For sampling, spatial 50% patch overlapping was used to compute the metrics (for performance purposes), and full overlapping for visualizations. Stochastic sampling was used with second-order correction for the first pyramid level. Also, stochasticity for text-to-video synthesis was disabled since it was not observed to improve the results. 128 steps were used for the first pyramid stage and then decreased exponentially for later stages, dividing the number of steps by 2 with each pyramid level increase.

As shown in Table 7, for all the models, almost the same amount of hyperparameters were used. For HPDM-T2V, joint video+image training was used as reflected by its batch size. For HPDM-T2V, low-resolution pre-training was also used by first training the lowest pyramid stage on 36×64-resolution videos for 500k steps.

TABLE 7

| Hyperparameter | HPDM -S | HPDM -M | HPDM -L | HPDM -T2V |
|---|---|---|---|---|
| Conditioning information | class labels | class labels | class labels | T5-11B embeddings |
| Conditioning dropout probability | 0.1 | 0.1 | 0.1 | 0.1 |
| Tokenization dim | 1024 | 1024 | 1024 | 1024 |
| Tokenizer resolution | 1 × 4 × 4 | 1 × 4 × 4 | 1 × 4 × 4 | 1 × 3 × 4 |
| Latent dim | 256 | 512 | 1024 | 3072 |
| Number of latents | 768 | 768 | 768 | 768 |
| Batch size | 768 | 768 | 768 | 4096 + 4096 |
| Target LR | 0.005 | 0.005 | 0.005 | 0.005 |
| Weight decay | 0.01 | 0.01 | 0.01 | 0.01 |
| Number of warm-up steps | 10k | 10k | 10k | 5k |
| Parallelization strategy | DDP | DDP | DDP | FSDP |
| Starting resolution | 16 × 64 × 64 | 16 × 64 × 64 | 16 × 64 × 64 | 8 × 36 × 64 |
| Target resolution | 64 × 256 × 256 | 64 × 256 × 256 | 64 × 256 × 256 | 64 × 288 × 512 |
| Patch resolution | 16 × 64 × 64 | 16 × 64 × 64 | 16 × 64 × 64 | 8 × 36 × 64 |
| Number of RIN blocks | 6 | 6 | 6 | 6 |
| Number of pyramid levels | 3 | 3 | 3 | 4 |
| Number of pyramid levels per block | 1/1/2/2/3/3 | 1/1/2/2/3/3 | 1/1/2/2/3/3 | 1/2/2/3/3/4 |
| Number of parameters | 178M | 321M | 725M | 3,934M |
| Number of training steps | 40k | 40k | 65k | 15k (+500k) |

The hierarchical patch-wise diffusion model (HPDM) thus trains in an end-to-end manner directly in the pixel space on high-resolution videos with state-of-the-art video generation performance on UCF-101 and promising scalability results. It will be appreciated by those skilled in the art that HPDM is applicable to other generative modeling families, such as GANs, VAEs, autoregressive models, and others.

Processing Platform

Figure 4:
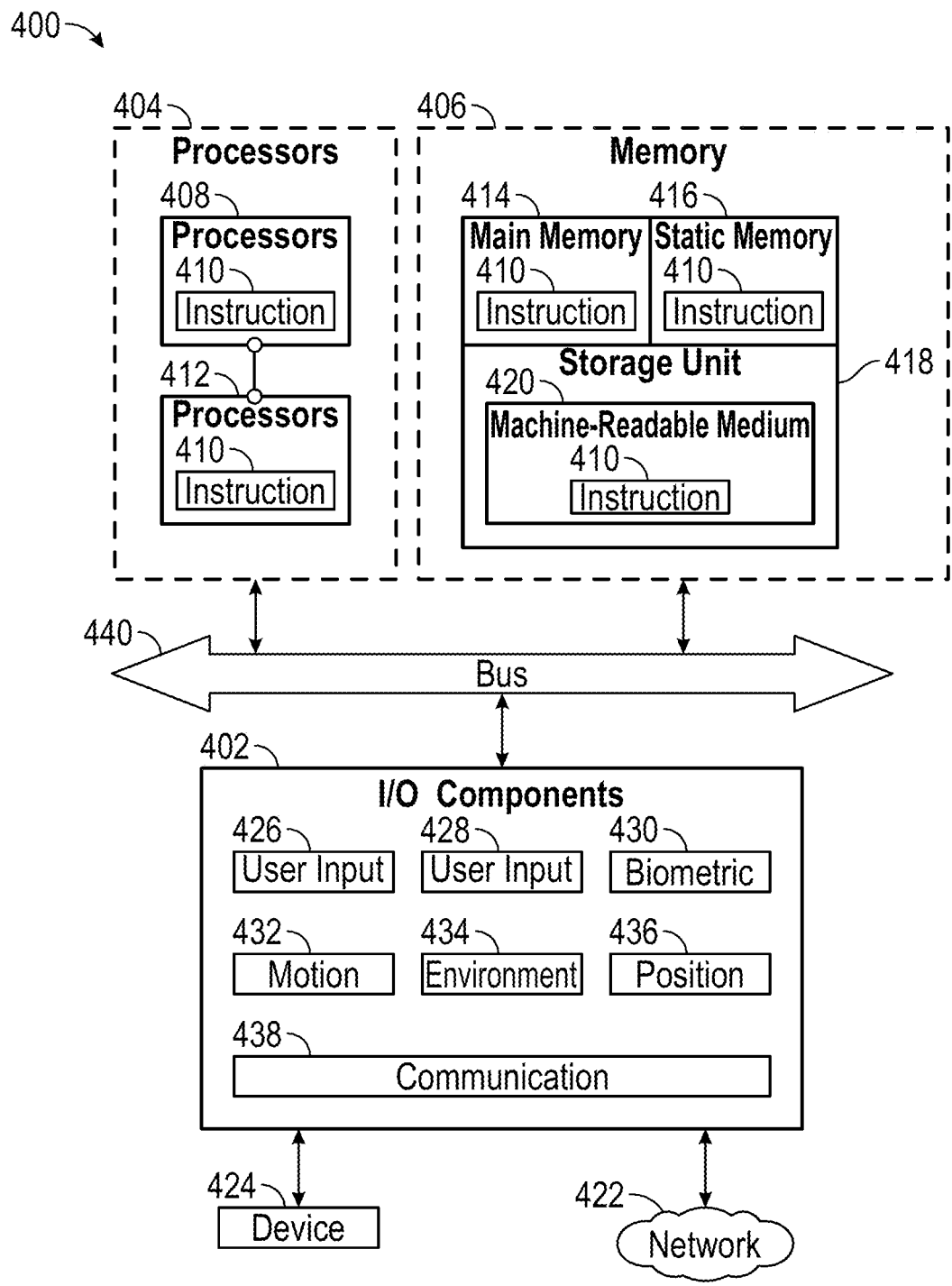
FIG. 4 is a block diagram of a machine within which instructions (e.g., software, a program, an application, an applet, an app, or other executable code) for causing the machine to perform one or more of the methodologies discussed herein may be executed.

FIG. 4 is a diagrammatic representation of the machine 400 within which instructions 410 (e.g., software, a program, an application, an applet, an app, or other executable code) for causing the machine 400 to implement the HPDM training discussed herein may be executed. For example, the instructions 410 may cause the machine 400 to execute one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform one or more of the methodologies discussed herein. The machine 400, for example, may implement the architecture of FIGS. 2A and 2B and the flow diagrams of FIG. 3A and FIG. 3B. In some examples, the machine 400 may also include both client and server systems, with certain operations of a particular method or algorithm being performed on the server-side and with certain operations of the particular method or algorithm being performed on the client-side.

The machine 400 may include processors 404, memory 406, and input/output I/O components 402, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may include two or more independent processors (sometimes referred to as "cores") that may execute instructions contemporaneously. Although FIG. 4 shows multiple processors 404, the machine 400 may include a single processor with a single core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 for one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

Any biometric data collected by the biometric components 430 is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Figure 5:
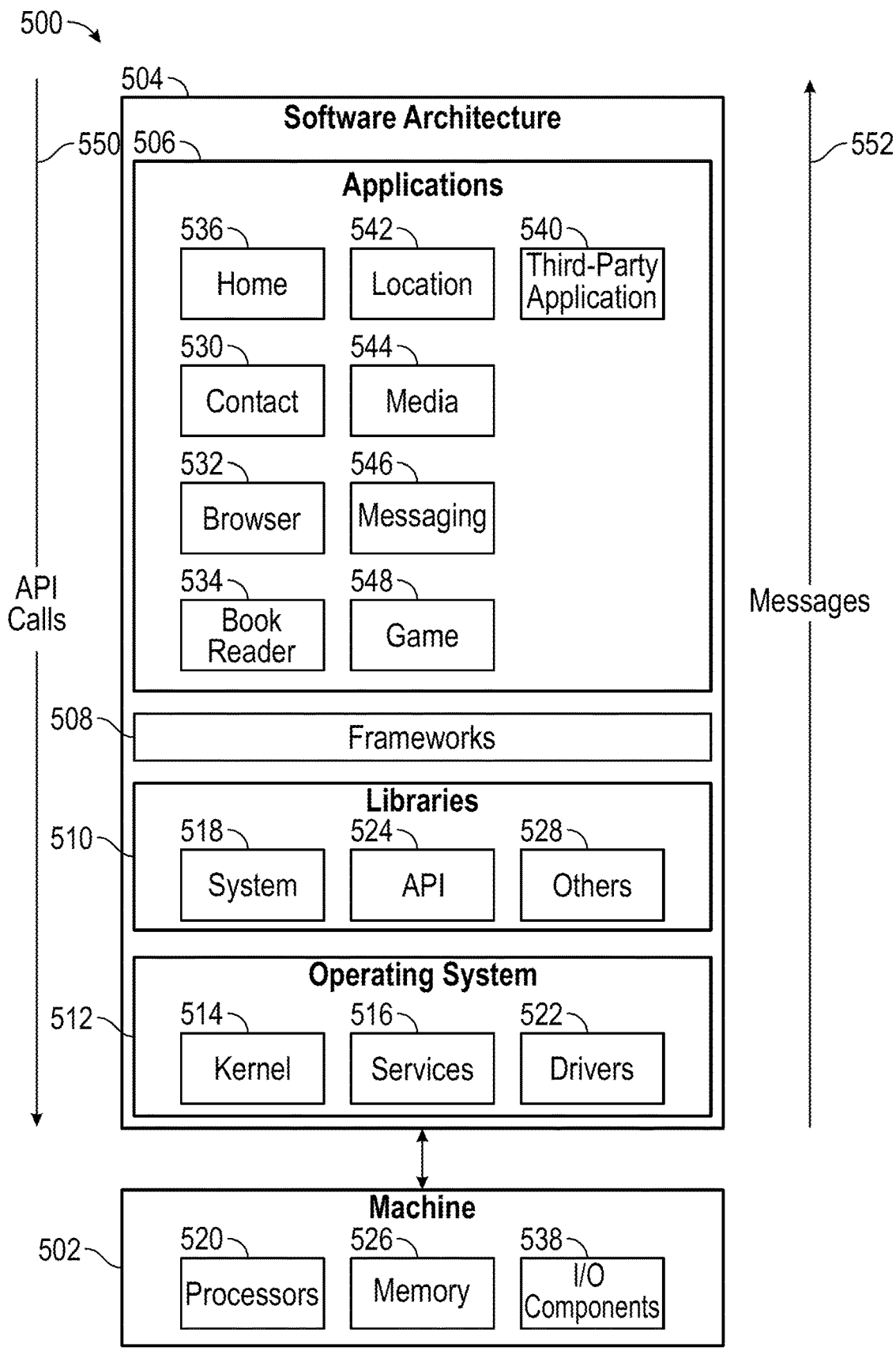
FIG. 5 is a block diagram showing a software architecture within which examples described herein may be implemented.

FIG. 5 is a block diagram 500 illustrating a software architecture 504, which can be installed on one or more of the devices described herein. The software architecture 504 is supported by hardware such as a machine 502 (see FIG. 4) that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to generate one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of generating images using a hierarchical patch-wise diffusion model (HPDM), comprising:
    training the HPDM on a dataset of at least one of videos or images, the HPDM having a hierarchical cascade-like structure including pipeline processing stages and patches that scale to decrease exponentially for each subsequent processing stage, wherein each patch comprises a continuous subgrid of pixel values extracted from an image or video that have a same resolution and include global information including a description of the image or video;
    sampling the image or video to extract a hierarchy of patches that are provided as input to the HPDM in such a way that a patch is located inside any previous patches so that the previous patches provide context information for the patch in each subsequent processing stage of the HPDM;
    providing a combination of patches and corresponding noise maps to train the HPDM to denoise all patches jointly;
    upsampling activations of lower resolution images of each processing stage to generate upsampled patches at higher resolutions relative to a previous processing stage to make the patches of a next processing stage of the HPDM globally coherent in a trained HPDM; and
    generating a synthesized image or video from a processing stage of the trained HPDM patch by patch.

2. The method of claim 1, wherein the sampling comprises grid sampling activations of the image or video with bilinear or trilinear interpolation from any previous processing stages, averaging resulting grid sampled activations, and concatenating averaged grid sampled activations to create spatially aligned features of the image or video.

3. The method of claim 2, further comprising providing the spatially aligned features to a processing stage of a recurrent interface network to create an activation tensor representative of normal network features of the image or video.

4. The method of claim 1, wherein the sampling comprises sampling patches using hierarchical overlapped sampling whereby the patches are sampled such that coordinates overlap between neighboring patches.

5. The method of claim 1, further comprising applying deep context fusion to condition a subsequent processing stage on spatially aligned, globally pooled features of any previous processing stages by pooling context information from previous processing stages into an input of the subsequent processing stage.

6. The method of claim 1, wherein training the HPDM to denoise all patches jointly includes exponentially reducing input noise scaling at each subsequent processing stage.

7. The method of claim 1, further comprising applying adaptive computation to successive processing stages whereby a subset of processing stages operate on high-resolution patches and low-resolution patches are processed by each processing stage.

8. The method of claim 7, wherein applying adaptive computation comprises skipping processing of high-resolution activations in at least one processing stage of the pipeline processing stages.

9. The method of claim 1, further comprising caching activations from previous processing stages during inference.

10. A system for generating images using a trained hierarchical patch-wise diffusion model (HPDM)-mages, comprising:
    a recurrent interface network (RIN) comprising a linear image tokenizer, followed by a sequence of identical attention-only pipeline processing stages and a linear detokenizer adapted to transform image tokens to red, green, blue (RGB) pixel values; and
    a processor adapted to provide an input image or video as an input to the RIN during training, the RIN processing the input image or video to create a hierarchical cascade-like structure including processing stages and patches that scale to decrease exponentially for each subsequent processing stage of the RIN, wherein each patch comprises a continuous subgrid of pixel values extracted from the image or video that have a same resolution and include global information including a description of the image or video, the processor further sampling the image or video to extract a hierarchy of patches that are provided as input to subsequent processing stages of the RIN in such a way that a patch is located inside any previous patches so that the previous patches provide context information for the patch in each subsequent processing stage of the RIN,
    wherein the RIN provides a combination of patches and corresponding noise maps to denoise all patches jointly, upsamples activations of lower resolution images of each processing stage to generate upsampled patches at higher resolutions relative to a previous processing stage to make the patches of a next processing stage of the RIN globally coherent, and generates a synthesized image or video from a processing stage of the RIN patch by patch.

11. The system of claim 10, wherein the processor grid samples activations of the image or video with bilinear or trilinear interpolation from any previous processing stages, averages resulting grid sampled activations, and concatenates averaged grid sampled activations to create spatially aligned features of the image or video.

12. The system of claim 11, wherein the processor provides the spatially aligned features to a processing stage of the RIN to create an activation tensor representative of normal network features of the image or video.

13. The system of claim 10, wherein the processor samples patches using hierarchical overlapped sampling whereby the patches are sampled such that coordinates overlap between neighboring patches.

14. The system of claim 10, wherein the RIN applies deep context fusion to condition a subsequent processing stage of the RIN on spatially aligned, globally pooled features of any previous processing stages by pooling context information from previous processing stages into an input of the subsequent processing stage.

15. The system of claim 10, wherein the RIN denoises all patches jointly during training by exponentially reducing input noise scaling at each subsequent processing stage of the pipeline processing stages.

16. The system of claim 10, wherein the RIN applies adaptive computation to successive processing stages whereby a subset of processing stages operate on high-resolution patches and low-resolution patches are processed by each processing stage.

17. The system of claim 16, wherein the RIN skips processing of high-resolution activations in at least one processing stage of the pipeline processing stages.

18. The system of claim 10, wherein the RIN caches activations from previous processing stages during inference.

19. A non-transitory computer-readable storage medium, the computer-readable storage medium including instructions that when executed by a processor cause the processor to implement a method of generating images using a hierarchical patch-wise diffusion model (HPDM), by performing operations comprising:

training the HPDM on a dataset of at least one of videos or images, the HPDM having a hierarchical cascade-like structure including pipeline processing stages and patches that scale to decrease exponentially for each subsequent processing stage, wherein each patch comprises a continuous subgrid of pixel values extracted from an image or video that have a same resolution and include global information including a description of the image or video;

sampling the image or video to extract a hierarchy of patches that are provided as input to the HPDM in such a way that a patch is located inside any previous patches so that the previous patches provide context information patch in each subsequent processing stage of the HPDM;

providing a combination of patches and corresponding noise maps to train the HPDM to denoise all patches jointly;

upsampling activations of lower resolution images of each processing stage to generate upsampled patches at higher resolutions relative to a previous processing stage to make the patches of a next processing stage of the HPDM globally coherent in a trained HPDM; and generating a synthesized image or video from a processing stage of the trained HPDM patch by patch.

20. The medium of claim 19, wherein the instructions for sampling the image or video further comprise instructions for grid sampling activations of the image or video with bilinear or trilinear interpolation from any previous processing stages, averaging resulting grid sampled activations, concatenating averaged grid sampled activations to create spatially aligned features of the image or video, and providing the spatially aligned features to a processing stage of a recurrent interface network to create an activation tensor representative of normal network features of the image or video.

* * * * *